UNITED STATES PATENT OFFICE.

PETER M. CARPENTER, OF BUFFALO GAP, TEXAS.

SHEEP-DIP.

SPECIFICATION forming part of Letters Patent No. 279,705, dated June 19, 1883.

Application filed April 7, 1883. (No specimens.)

*To all whom it may concern:*

Be it known that I, PETER M. CARPENTER, a citizen of the United States, and a resident of Buffalo Gap, in the county of Taylor and State of Texas, have invented a new and useful Improvement in Sheep-Dips; and I do hereby declare that the following is a full, clear, and exact description of the same.

My invention relates to a new composition of matter for the treatment of "scab" on sheep or for other animals subject to like diseases.

It is composed of broom-weed, (*Scoparius*,) sulphur, and water.

In preparing the dip I take one pound of the broom-weed or extract of the same, one-third pound of powdered sulphur, and one gallon of water, which ingredients are thoroughly mixed together and used as a warm liquid, to be applied either as a bath or by hand.

I do not confine myself to the proportion of the ingredients, but may vary the same at will.

This composition I find very effective for the treatment of scab in sheep, and it is harmless to both the sheep and the workmen who apply it.

Having thus described my invention, what I claim as new is—

A composition of matter for producing a sheep-dip, composed of broom-weed (*Scoparius*,) or extract thereof, sulphur, and water, mixed in or about the proportions described.

PETER M. CARPENTER.

Witnesses:
W. C. CHEATHAM,
S. A. SOWELL.